UNITED STATES PATENT OFFICE.

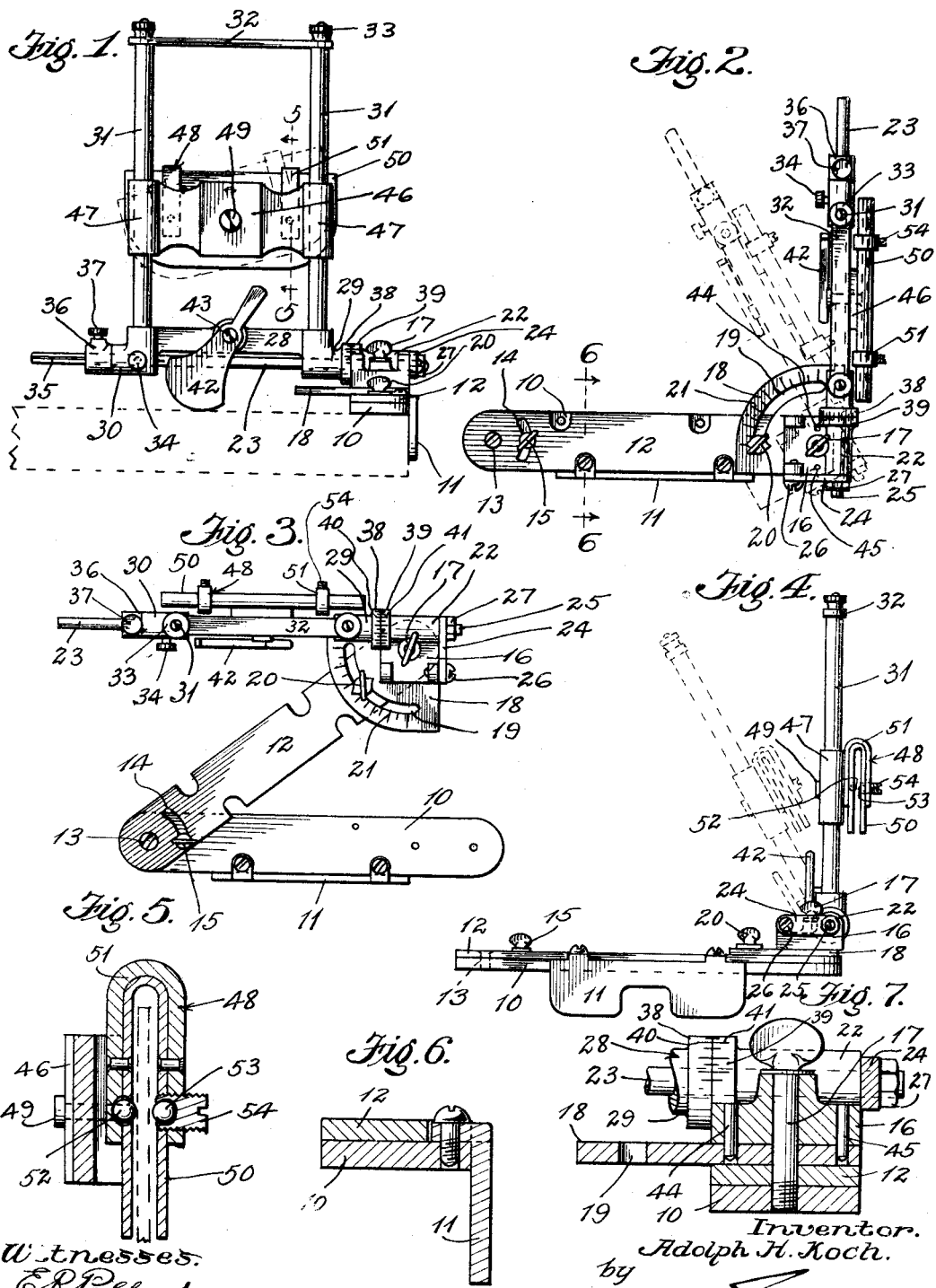

ADOLPH H. KOCH, OF LOS ANGELES, CALIFORNIA.

SAW-GUIDING INSTRUMENT.

1,064,346.

Specification of Letters Patent. Patented June 10, 1913.

Application filed February 14, 1912. Serial No. 677,613.

*To all whom it may concern:*

Be it known that I, ADOLPH H. KOCH, a citizen of the United States, residing at Los Angeles, in the county of Los Angeles and State of California, have invented new and useful Improvements in Saw-Guiding Instruments, of which the following is a specification.

This invention relates to improvements in saw guiding means and particularly to a mechanism which is adapted to hold a saw for mitering purposes, or for ripping work as desired.

It is an object of the invention to provide a saw guiding instrument which may be held or clamped upon work or upon a work bench and which may be used as a mitering instrument or may be employed to guide a saw in vertical or tipped planes or in ripping lumber in strips with parallel edges.

It is also an object of the invention to provide a saw guiding implement with movable means for engaging the saw and clamping means for holding the said movable means at various angles with respect to the work or the material which is to be operated upon.

In the accompanying drawing forming a part of this specification, Figure 1 is an end elevation of the improved saw guiding means, the side of the frame for guiding the saw being shown. Fig. 2 is a top plan view of the instrument when in position for cross cut sawing or mitering purposes. Fig. 3 is a top plan of the instrument as set for ripping purposes. Fig. 4 is a side elevation of the implement, the saw guiding frame being shown in position for making a cross cut. Fig. 5 is an enlarged detail sectional view taken through the saw guiding means upon the line 5—5 of Fig. 1. Fig. 6 is a detail sectional view taken upon the line 6—6 of Fig. 2. Fig. 7 is an enlarged detail sectional view taken through the clamping head employed for holding the saw guiding frame in its various positions.

The details and features of the invention will now be more particularly described, reference being had to the said drawing, in which 10 indicates a base plate provided with a side flange plate 11, arranged at right angles thereto and adapted to engage the edge of the material worked upon or the edge of a work bench as found desirable. Pivotally secured to the base plate 10 is an adjustable plate 12 of approximately the same size and shape as the said plate 10 and adapted in using the implement for certain purposes to be fitted over the said plate 10. The plate 12 is pivoted at one end as at 13 to the end of the plate 10 and is formed with a segmental slot 14 engaging a set screw 15 carried by the said plate 10, by which the plate 12 may be clamped in its various positions with respect to the plate 10.

The outer end of the plate 12 carries a clamping head 16, which is held in position on said plate by means of a set screw 17. The said head is also provided with a plate 18 in which a segmental slot 19 is formed, which engages a set screw 20 carried by the plate 12. The plate is preferably provided with graduations 21 so that the head may be set at any desired angle with respect to the plate 12 or the plate 10 in order to do miter work.

The head 16 is provided with an elongated bearing at 22 in which is journaled a longitudinally extending shaft 23. The shaft 23 is screw threaded at one end and a bar 24 is provided with a screw threaded opening which is screwed upon the end 25 of said shaft 23 and is adapted to tighten the shaft in position when it is turned downwardly to the position shown in Figs. 2, 3 and 4 where it is held by a removable screw 26. A lock nut 27 is also applied upon the end of the said shaft 23 outside the bar 24 for further binding the parts in position and insuring the holding of the frame carried upon the shaft 23 in vertical position.

The saw guiding frame employed is made up of a longitudinal head 28, having bearings 29 and 30 at its ends adapted to fit upon the shaft 23. Standards 31 rise from the said longitudinal head to a suitable height and are connected at their upper ends by a bar 32, which fits upon screw threaded reduced ends formed upon said standards. Thumb nuts 33 engaging said screw threaded reduced ends, clamp the bar 32 in position. The frame thus formed is held against turning upon the shaft 23 by means of a set screw 34 which engages an elongated groove or kerf 35 formed in the said shaft 23. The said cross head 28 is also held in place by means of a collar 36 which is adapted to be clamped upon the said shaft 23 by a set screw 37.

One of the journals 29 is provided with a flange 38, which bears against a correspondingly shaped flange 39, formed upon the head 16. The said flanges are preferably provided with graduations as at 40 and 41 respectively whereby the angular position of the saw guiding frame with respect to the head 16 may be adjusted and set. The frame for guiding the saw is thus carried by the shaft 23 which is supported at one end by the said head 16. When the head and the saw guiding frame carried thereby, has been properly adjusted to the desired position, the shaft is usually further supported by means of a cam 42, which is pivoted at 43, upon the elongated head 28 and when turned downwardly will brace the said head with respect to the work.

The head 16 is prevented from turning with respect to the plate 18 by means of dowel pins 44 and 45 which are carried by said head and project into apertures formed in said plate as clearly shown in Fig. 7. The saw guiding frame is provided with an adjustable cross head 46 having end sockets 47, fitting snugly upon the said standards 31 and yet so that they can be forced up and down. Pivoted upon the central portion of said head 46 is a saw guiding member 48, the said guiding member being held by means of a pivot pin 49 projecting from the central portion of said cross head 46. The saw guiding member is provided with an inner folded plate 50 and outer strengthening yokes 51, U shaped in cross section as shown in Fig. 5. Ball bearings 52 and 53 are also provided in the said guiding member for engaging the opposite sides of the saw, to prevent any frictional contact between the saw and said guiding member. The outer balls 53 are preferably adjustably held in position by set screws 54 clearly illustrated in Fig. 5. The formation of the guide is such that the saw may be drawn back and forth within the same without friction and yet be held at the proper angle with respect to the work, to accomplish the mitering or other operation thereon.

When it is desired to miter material, the device is placed upon the edge of a work bench and preferably clamped thereto in any desired manner and the saw guiding frame is set at the desired angle to produce the proper miter, the set screw 20 being tightened for clamping the said frame in position. When using the device in this manner the plate 12 is usually clamped directly over and upon the plate 10 as shown in Fig. 2. The saw moves loosely in the guide for producing the desired cut. When in this position also an inclined cut, tipped from a vertical position, may be made by turning the saw frame with the shaft 23 upon the head 16 as indicated in dotted lines in Fig. 4, thus a baffle or miter in a different plane from that contemplated in the adjustment shown in Fig. 2 may be accomplished. When it is desired to rip a piece of lumber, the plate 12 is adjusted with respect to the plate 10. By moving the plate 10 with the guide 11, along from point to point, a continued and accurate ripping of the material can be accomplished.

What I claim is:

1. A saw guiding implement comprising a guiding base to engage the material, an adjustable plate pivoted at one of its ends to said guiding base, a segment plate pivoted to the opposite end of said adjustable plate, an adjustable saw guiding frame mounted on said segment plate, and means to clamp each of said parts in relation to each other.

2. A saw guiding implement comprising a guiding base provided with a flange, an adjustable plate pivoted at one of its ends to said guiding base, a segment plate pivoted to said opposite end of said adjustable plate, a lateral shaft carried by said segment plate and adjustably supported thereon, and a saw guiding frame carried by said shaft.

3. A saw guiding implement comprising a guiding base plate, an adjustable plate pivoted thereon, a head pivotally and adjustably mounted on said latter plate, a lateral shaft carried by said head, a saw guide frame mounted on said shaft, and means for clamping the parts at various angles with respect to each other.

4. A saw guiding implement comprising a work engaging base, a plate pivoted thereto and adapted to be clamped at different angles with respect to the same, a head also pivoted to said plate and adapted to be clamped at various angles with respect thereto, a shaft carried by the said head, a saw frame mounted thereon and adapted to be clamped in various inclined positions in a vertical position thereon, and a pivoted saw engaging guide member carried by said frame.

In witness that I claim the foregoing I have hereunto subscribed my name this 7th day of February, 1912.

A. H. KOCH.

Witnesses:
EDMUND A. STRAUSE,
EARLE R. POLLARD.